ical Cl. C07d 41/00, 41/06
U.S. Cl. 260—239.3       7 Claims

ABSTRACT OF THE DISCLOSURE

A process for the preparation of ε-caprolactam or ω-laurolactam, characterized by contacting in vapor phase nitrocyclohexane or nitrocyclododecane with a catalyst containing metallic lead or a lead oxide at a temperature within the range of from 180° C. to 450° C.

---

This invention relates to the preparation of various lactams that are materials for a polyamide useful as synthetic fiber and synthetic resin. More particularly, this invention relates to a process for the preparation of corresponding ε-caprolactam or ω-laurolactam from nitrocyclohexane or nitrocyclododecane at one reaction step by a vaporphase contact reaction.

Heretofore, as a process for preparing ε-caprolactam from nitrocyclohexane by a vapor-phase contact reaction, a process of passing a mixed gas of nitrocyclohexane and hydrogen onto a reduction catalyst heated to a temperature of 90–300° C. to obtain cyclohexanone oxime, and making said oxime ε-caprolactam by the Beckmann rearrangement reaction has been known. However, preparation of a lactam by this process not only increases number of steps, but also formation of ammonium sulfate as by-product is unavoidable. Therefore, if a lactam is obtained from nitrocyclohexane by one step, that it is advantageous is self-evident.

Obtaining of ε-caprolactam from nitrocyclohexane at one step by a vapor-phase contact reaction has been proposed in U.S. Pat. 2,634,269. According to the process described in said U.S. patent, by passing nitrocyclohexane onto a solid dehydration catalyst such as, for instance, alumina, thoria, ceria, zirconia, magnesia, titanium oxide and heteropolyacids heated to a temperature of 150–450° C., ε-caprolactam is obtained at one step, however, there is a defect that according to said process, besides the lactam, considerable amounts of aniline, cyclohexanone, cyclohexene, a resinous material having a boiling point higher than that of ε-caprolactam, etc. are formed as by-products.

As a result of study, the present inventors have found that when as a catalyst metallic lead or various lead oxides is used, ε-caprolactam or ω-laurolactam is obtained at a yield same as or higher than that described in the process in said U.S. patent, at the same time, formation as by-products of the aforementioned aniline, cyclohexene and resinous material having a high boiling point is very little.

Namely, the process of this invention is a process for the preparation of lactams which comprises contacting in vapor phase nitrocyclohexane or nitrocyclododecane with a catalyst containing metallic lead or a lead oxide.

As the catalyst used in the process of this invention, what contains metallic lead or a lead oxide will do, for instance, it is possible to use metallic lead in the state of amalgam as well.

As the lead oxide used in the process of this invention, lead in whatever oxidized form will do, for instance, lead suboxide ($Pb_2O$), lead monoxide (PbO), lead sesquioxide ($Pb_2O_3$), plumbo-plumbic oxide ($Pb_3O_4$) and lead dioxide ($PbO_2$) may be cited.

Said lead or lead oxides may be used per se in the form of powder, lump or granule as a catalyst, however, the same in admixture with a proper carrier or supported by a proper carrier may be used as a catalyst also. When a detailed explanation is made about this, it will become as follows.

Namely, in this invention, by heating or calcining lead hydroxide or an inorganic or organic acid salt of lead such as, for instance, lead hydroxide [$Pb(OH)_2$], basic lead carbonate [$(PbCO_3)_2 \cdot Pb(OH)_2$], lead nitrate [$Pb(NC_3)_2$], lead acetate [$Pb(CH_3COO)_2 \cdot 3H_2O$] and lead phthalate [$Pb \cdot C_6H_4(COO)_2$] to a proper temperature, for instance, 200–1300° C., preferably 300–1000° C., lead oxides are prepared and they may be used as a catalyst in the form of powder or other shape such as pellets.

Also in this invention, said lead or lead oxides may be supported by a proper carrier and used as a catalyst or may be used in admixture with a proper carrier. In order to have a proper carrier supported lead oxides, for instance, it is possible to impregnate or precipitate a carrier with an aqueous solution or a water dispersed solution of an inorganic or organic acid salt of lead such as, for instance, lead nitrate and lead acetate, dry the impregnated or precipitated carrier and calcine the same at a temperature of about 200–1300° C.

As a carrier, oxides of metals other than lead of Groups I-B–IV and oxides of metals of Groups VI–VIII of the Periodic Table, or their double salts or complex compounds are used. An oxide of an alkali metal of Group I–A of the Periodic Table tends to produce a by-product such as aniline and has a property of inhibiting the reaction, therefore, it is undesirable. Also an oxide of a metal of Group V of the Periodic Table has a remarkable action of inhibiting the reaction and is undesirable. In this invention solid acids such as, for instance, acid clay, acid-treated acid clay, fuller's earth, bentonite, silica, alumina and silica-alumina are especially excellent as carriers. The solid acid as herein referred to is what is solid and acidic.

In this invention, as mentioned above, when an aqueous solution or water dispersion of an inorganic or organic acid salt of lead is impregnated in the aforesaid solid acid or a metal oxide other than the solid acid such as calcium oxide or zinc oxide and calcine the same at a high temperature, an adduct or a double salt such as, for instance, $PbO \cdot Al_2O_3$, $PbO \cdot SiO_2$, $PbO \cdot CaO$ and $PbO \cdot ZnO$ is produced, however, these adducts or double salts may be used in this invention same as lead oxide alone or a mixture of lead oxide and these carriers. Accordingly, lead oxides as referred to in this invention are defined as including an adduct or a double salt obtained by treatment at a high temperature as mentioned above. In the process of this invention, when metallic lead or lead oxides are used concurrently with a solid acid as a carrier, because conversion advances, it is preferably.

At this time, it is preferable to adopt as a using ratio of a lead catalyst to a solid acid, a weight ratio of 1:10 to 10:1, where the solid acid plays a role as a carrier also.

Upon practising the process of this invention, vapor of nitrocyclohexane or nitrocyclododecane is contacted with said catalyst, a mixture of said catalyst supported by a carrier at a temperature of 180–450° C., preferably 200–350° C., thereafter cooling and condensing said vapor to give a reaction product. At this time, it is possible to use a non-oxidizing gas such as nitrogen, carbon dioxide, helium, argon, hydrogen and carbon monoxide as a carrier gas, espectially use of a reducing gas such as hydrogen and carbon monoxide as a carrier gas is advantageous for the purpose of advancing yield of a lactam. The reaction may be carried out under a reduced pressure, atmospheric pressure or under a pressure, however, industrially it is preferable to carry out the reaction under atmospheric pressure. In this invention, it is especially preferable to contact lead monoxide with a solid acid, particularly to contact nitrocyclohexane or nitrocyclododecane with a catalyst consisting of lead monoxide and acid clay or silica-alumina in a hydrogen gas.

According to the process of this invention, besides ε-caprolactam or ω-laurolactam, a cycloalkanone corresponding to the starting material, namely, cyclohexanone or cyclododecanone is produced, however, other by-products are very little. Therefore, by applying to said reaction products a hitherto known purifying means such as distillation, treatment with an oxidizing agent or recrystallization, it is possible to easily separate and obtain high-purity ε-caprolactam or ω-laurolactam. As such, according to this invention, a great advantage that a lactam having an industrially utilizable value is produced at a high yield by one step from nitrocyclohexane or nitrocyclododecane, moreover, said lactam and a cycloalkanone are obtainable in relatively pure forms, is achieved.

Next, the process of this invention will be stated in detail by citing examples, wherein unless otherwise indicated parts means parts by weight.

EXAMPLES 1–8

Nitrocyclohexane was evaporated and the resultant vapor was contacted with catalyst powders mentioned in column 2 kept at temperatures mentioned in column 3 of the following Table 1 using carrier gases shown in column 4 so that the contact times of nitrocyclohexane vapor with the catalysts might become times shown in column 5.

As a result of reactions, conversions, yields of ε-caprolactam and yields of cyclohexanone were as shown in the following Table 1.

TABLE 1

| Example | Kind of catalyst | Average catalyst temp. (° C.) | Carrier gas | Contact time (sec.) | Conversion (percent) | Yield of lactam (percent) | Yield of cyclohexanone (percent) |
|---|---|---|---|---|---|---|---|
| 1 | Pb | 260 | N₂ | 3.0 | 30 | 40 | 45 |
| 2 | Pb₂O | 270 | He | 3.5 | 40 | 41 | 44 |
| 3 | PbO | 280 | None | 2.5 | 40 | 35 | 37 |
| 4 | PbO | 265 | N₂ | 1.5 | 45 | 35 | 37 |
| 5 | PbO | 265 | H₂ | 1.5 | 87 | 39 | 34 |
| 6 | Pb₂O₃ | 270 | N₂ | 3.0 | 58 | 38 | 45 |
| 7 | Pb₃O₄ | 310 | He | 2.0 | 80 | 37 | 45 |
| 8 | PbO₂ | 270 | N₂ | 1.5 | 51 | 44 | 41 |

As will be apparent upon comprising Examples 3–5 shown in Table 1, it is understood that when hydrogen is used as a carrier gas, conversion and yield of lactam advance.

EXAMPLES 9–13

These examples will show cases wherein solid acids are noncurrently used.

Nitrocyclohexane was evaporated, using hydrogen as a carrier gas, the resultant vapor was contacted with catalyst powders shown in column 2 kept at temperatures shown in column 5 of the following Table 2 under pressures shown in column 6 so that the contact times of nitrocyclohexane vapor with the catalysts might become times shown in column 7.

By cooling and condensing vapors coming out of the catalyst phases, the reaction products were obtained.

As a result of reactions, conversions, yields of ε-caprolactam and yields of cyclohexanone were as shown in the following Table 2.

TABLE 2

| Example | Catalyst Lead compound | Catalyst Solid acid | Wt. ratio of Pb compound to solid acid | Average catalyst temperature (° C.) | Pressure | Contact time (sec.) | Conversion (percent) | Yield of lactam (percent) | Yield of cyclohexanone (percent) |
|---|---|---|---|---|---|---|---|---|---|
| 9 | Pb | Acid clay | 1:1 | 270 | Atom.¹ | 2.5 | 85 | 42 | 43 |
| 10 | PbO | Acid clay | 3:1 | 265 | Atom | 3.4 | 97 | 49 | 26 |
| 11 | PbO | Silicaalumina | 1:8 | 270 | Atom | 1.0 | 95 | 37 | 20 |
| 12 | PbO | Acid clay | 1:5 | 195 | 8 cm. Hg | 1.1 | 91 | 38 | 30 |
| 13 | PbO | Acid clay | 8:1 | 280 | Atom | 2.0 | 94 | 41 | 38 |

¹ Atom. stands for atmospheric pressure.

As will be apparent upon comparing Table 2 with the results of Table 1, when solid acids are concurrently used, advancement of conversions is observed.

EXAMPLES 14–15

Nitrocyclododecane was evaporated and the resultant vapor contacted with catalyst powders under conditions shown in the following Table 3.

By cooling and condensing vapors coming out of the catalyst phases, the reaction products were obtained.

As a result of reactions, conversions, yields of lactam and yields of cyclododecanone were as shown in the following Table 3.

TABLE 3

| Example | Catalyst Lead compound | Catalyst Solid acid | Wt. ratio of Pb compound to solid acid | Average catalyst temperature (° C.) | Pressure (mm. Hg) | Contact time (sec.) | Carrier gas | Conversion percent | Yield of lactam (percent) | Yield of cyclododecanone (percent) |
|---|---|---|---|---|---|---|---|---|---|---|
| 14 | PbO | Acid clay | 1.1 | 280 | 20 | 2–3 | H₂ | 75 | 37 | 39 |
| 15 | PbO₂ | None | | 290 | 20 | 2–3 | N₂ | 68 | 33 | 38 |

EXAMPLES 16–25

In these examples, examples of using catalysts obtained by heating lead oxides and other metal oxides as shown in the following A–J in producing -caprolactam from nitrocyclohexane will be shown.

(A) What was obtained by immersing silica-alumina ($SiO_2 \cdot Al_2O_3$) in an aqueous solution of lead nitrate [$Pb(NO_3)_2$] and heating the mixed solution at 700° C. for 5 hours.

(In this produced catalyst, a weight ratio of PbO to $SiO_2 \cdot Al_2O_3$ was 2:13.)

(B) What was obtained by mixing lead dioxides ($PbO_2$) with silica ($SiO_2$) at a weight ratio of 1:2, and heating the mixture at 850° C. for 5 hours.

(C) What was obtained by mixing lead dioxide ($PbO_2$) with alumina ($Al_2O_3$) at a weight ratio of 1:2, and heating the mixture at 850° C. for 5 hours.

(D) What was obtained by mixing lead monoxide (PbO) with calcium hydroxide at a weight ratio of 1:1, and heating the mixture at 850° C. for 5 hours.

(E) What was obtained by mixing lead dioxide (PbO₂) with calcium oxide at a weight ratio of 1:1, and heating the mixture at 850° C. for 5 hours.

(F) What was obtained by mixing lead dioxide (PbO₂) and zinc oxide at a weight ratio of 1:1, and heating the mixture at 850° C. for 5 hours.

(G) What was obtained by mixing lead monoxide (PbO) with silver nitrate at a weight ratio of 4:1, and heating the mixture at 850° C. for 5 hours.

(H) What was obtained by mixing an aqueous solution of lead acetate [(CH₃COO)₂·3H₂O] with silver bichromate at a molar ratio of 1:1, and heating the mixture at 850° C. for 5 hours.

(I) What was obtained by mixing lead monoxide (PbO) with chromium oxide (CR₂O₃) at a weight ratio of 1:1, and calcining the mixture at 300° C. for 3 hours.

(J) What was obtained by mixing lead monoxide (PbO) with maganese oxide (MnO) at a weight ratio of 2:1, and calcining the mixture at 300° C. for 5 hours.

With the catalysts obtained as in said A–J, 10 grams of nitrocyclohexane were contacted while passing H₂ gas at a flow speed of 8 liters/hr. The amounts of the catalsts, average catalyst temperatures, reaction pressures, yields of obtained ε-caprolactams and cyclohexanones and conversions of nitrocyclohexane at that time were shown in the following Table 4.

tate well with water until pH became 7, calcining the washed precipitate at 300° C. for 3 hours and at 500° C. for 15 hours. (A molar ratio of Pb to Al was 4:1.)

(O) What was obtained by dissolving 50 grams of lead nitrate [Pb(NO₃)₂] and 20 grams of calcium nitrate in 200 cc. of water, adding to said mixed solution a 10% aqueous solution of caustic soda to bring about white precipitate, washing the precipitate with water until pH became 7, drying the washed precipitate and calcining the dried precipitate at 300° C. for 7 hours and at 600° C. for 9 hours. (A molar ratio of Pb to Ca was 5:3.)

(P) What was obtained by mixing 40 grams of lead nitrate [Pb(NO₃)₂] and 40 grams of nickel nitrate, dissolving the mixture in 200 cc. of water, bringing about white precipitate by using a 10% caustic soda solution, washing the precipitate well with water, drying the washed precipitate, and calcining the dried precipitate at 250° C. for 4 hours and at 550° C. for 4 hours. (A molar ratio of Pb to Ni was 10:11.)

(Q) What was obtained by dissolving 33 grams of lead nitrate and 25 grams of manganese nitrate in 200 cc. of water, adding to the obtained solution (pH=2.5) a 14% ammonia water to make pH 9 and bring about precipitate, filtering the precipitate, thereafter drying and calcining the same at 500° C. for 8 hours. (A molar ratio of Pb to Mn was 1:1.)

(R) What was obtained by dissolving 33.2 grams of lead nitrate [Pb(NO₃)₂] and 44.5 grams of zinc nitrate

TABLE 4

| Example: | Kind of catalyst | Amount of catalyst used (g.) | Average catalyst temp. (° C.) | Pressure (mm. Hg) | Conversion (percent) | Yield of caprolactam (percent) | Yield of cyclohexanone (percent) |
|---|---|---|---|---|---|---|---|
| 16 | A | 5 | 260 | 760 | 80 | 41 | 20 |
| 17 | B | 15 | 260 | 760 | 70 | 35 | 25 |
| 18 | C | 15 | 260 | 760 | 70 | 33 | 30 |
| 19 | D | 15 | 260 | 760 | 80 | 35 | 35 |
| 20 | E | 15 | 260 | 760 | 60 | 27 | 30 |
| 21 | F | 15 | 260 | 760 | 65 | 27 | 32 |
| 22 | G | 15 | 260 | 760 | 70 | 30 | 31 |
| 23 | H | 15 | 200 | 9.5 | 90 | 34 | 28 |
| 24 | I | 20 | 245 | 760 | 80 | 35 | 38 |
| 25 | J | 20 | 245 | 760 | 70 | 30 | 28 |

EXAMPLES 26–36

In these examples, examples of using catalysts prepared from lead nitrate, or lead acetate with other metal or nitrate or acetate of the other metal as in the following K–U in producing ε-caprolactam will be shown.

(K) What was obtained by dissolving 17.0 grams of lead acetate [Pb(CH₃COO)₂·3H₂O] in 50 cc. of water, immersing into which solution 1.0 gram of pulverized palladium asbestos (including 3% of Pd), evaporating, drying and solidifying, thereafter heating the solidified mixture at 300° C. for 3 hours, further calcining the heated mixture at 400° C. for 8 hours and pulverizing the calcined mixture.

(L) What was obtained by dissolving 40 grams of lead nitrate [Pb(NO₃)₂] and 10 grams of silver nitrate in 200 cc. of water, gradually dropping to which mixed solution caustic soda solution with stiring until pH became 9, washing the produced white brown coprecipitate with water until pH became 7 and drying the washed coprecipitate, thereafter calcining the heated coprecipitate at 200° C. for 2 hours and 500° C. for 9 hours. (A molar ratio of Ag to Pb was 1:4.)

(M) What was obtained by mixing 30 grams of lead acetate [Pb(CH₃COO)₂·3H₂O] and 20 grams of cobalt acetate, dissolving the mixture in 50 cc. of water, evaporating, drying and solidifying the mixed solution and calcining the solidified mixed solution at about 400–500° C. for 5 hours. (A molar ratio of Pb to Co was 2:1.)

(N) What was obtained by dissolving 30 grams of lead acetate [Pb(CH₃COO)₂·3H₂O] and 30 grams of aluminium nitrate in 200 cc. of water, dropping to which mixed solution a 14% of ammonia water with stirring to make pH 9, washing the produced white gel-like precipiin 200 cc. of water, adding to said mixed solution a 14% ammonia water to make pH 8, washing the produced white precipitate well with water, drying the washed precipitate and calcining the dried precipitate at 400° C. for 15 hours. (A molar ratio of Pb to Zn was 1:1.)

(S) What was obtained by dissolving 33.2 grams of lead nitrate [Pb(NO₃)₂] and 51.2 grams of magnesium nitrate [Mg(NO₃)₂·6H₂O] in 200 cc. of water, adding to said mixed solution 100 cc. of a solution containing 30 grams of ammonium carbonate to bring about precipitate, washing the precipitate well with water, drying the washed precipitate and calcining the dried precipitate at 650° C., for 16 hours. (A molar ratio of Pb to Mg was 1:2.)

(T) What was obtained by dissolving 33.1 grams of lead nitrate [Pb(NO₃)₂] and 24.1 grams of copper nitrate [Cu(NO₃)₂·3H₂O] in 200 cc. of water, adding to said mixed solution a 7N ammonia water until pH became 7 to precipitate simultaneously hydroxides of lead and copper, drying the precipitate and calcining the dried precipitate at 200° C. for 3 hours and at 500° C. for 5 hours. (A molar ratio of Pb to Cu was 1:1.)

(U) What was obtained by dissolving 40 grams of sodium silicate (water glass) in water to make the whole 100 cc., pouring the mixed solution in 100 cc. of a 7 N nitric acid, next, dissolving 33.1 grams of lead nitrate [Pb(NO₃)₂] in 100 cc. of water, mixing the mixed solution with said sodium silicate-nitric acid solution, thereafter, adding to the resultant mixed solution a 7 N ammonia water until pH became 9 to bring about white precipitate, washing the precipitate well with water, drying the washed precipitate and calcining the dried precipitate at 300° C. for 5 hours and at 500° C. for 8 hours.

With the catalysts obtained as in said K–U, 6.0 grams of nitrocyclohexane were contacted for 1.5 hours under atmospheric pressure while passing $H_2$ gas thereinto. The catalyst amounts, average catalyst temperature, flowing amounts of $H_2$, yields of the obtained ε-caprolactam, yields of cyclohexanone and conversions of nitrocyclohexane at that time were shown in the following Table 5.

TABLE 5

| Kind of catalyst | Amount of catalyst used (g.) | Average catalyst temp. (° C.) | Flowing amount of $H_2$ (liter) | Conversion (percent) | Yield of lactam (percent) | Yield cyclo-hexanone (percent) |
|---|---|---|---|---|---|---|
| Example: | | | | | | |
| 26.... K | 10.0 | 235 | 25.1 | 66 | 37 | 36 |
| 27.... L | 20.0 | 240 | 12.3 | 81 | 26 | 23 |
| 28.... M | 20.0 | 250 | 30.0 | 85 | 25 | 37 |
| 29.... N | 20.0 | 250 | 18.8 | 77 | 25 | 30 |
| 30.... O | 20.0 | 250 | 18.9 | 95 | 27 | 32 |
| 31.... P | 10.0 | 240 | 18.8 | 70 | 32 | 30 |
| 32.... Q | 10.0 | 245 | 20.0 | 65 | 30 | 31 |
| 33.... R | 10.0 | 240 | 12.0 | 72 | 28 | 32 |
| 34.... S | 20.0 | 240 | 12.0 | 80 | 24 | 29 |
| 35.... T | 20.0 | 250 | 10.0 | 85 | 35.0 | 41 |
| 36.... U | 10.0 | 305 | 25.0 | 60 | 30.0 | 25.0 |

What is claimed is:

1. A process for the preparation of ε-caprolactam or ω-laurolactam, comprising contacting, in vapor phase nitrocyclohexane or nitrocyclododecane with a catalyst comprising metallic lead or a lead oxide at a temperature within the range of from 200° C. to 350° C.

2. A process according to claim 1 wherein lead monoxide (PbO) is used as said catalyst.

3. A process according to claim 1 wherein said catalyst consists of metallic lead or a lead oxide and a solid acid.

4. A process according to claim 3, wherein said solid acid is acid clay, acid-treated acid clay, fuller's earth, bentonite, silica, alumina or silica-alumina.

5. A process according to claim 1 wherein said nitrocyclohexane or nitrocyclododecane together with a non-oxidizing gas is contacted in vapor phase with said catalyst containing metallic lead or a lead oxide.

6. A process according to claim 1, wherein said nitrocyclohexane or nitrocyclododecane together with a reducing gas is contacted in vapor phase with a catalyst comprising metallic lead or a lead oxide and a solid acid.

7. A process according to claim 1, wherein said nitrocyclohexane or nitrocyclododecane is contacted in vapor phase with a catalyst prepared by impregnating or precipitating an aqueous solution or dispersed solution of an inorganic or organic acid salt of lead in or with a carrier selected from the group consisting of a solid acid, an oxide of a metal except lead belonging to Groups I-B-IV of the Periodic Table and a metal belonging to Groups VI-VIII of the Periodic Table, a double salt thereof and a complex salt thereof, thereafter drying and heating the impregnated or precipitated product to a temperature within the range of from 200° C. to 1300° C.

References Cited

UNITED STATES PATENTS

| 2,298,375 | 10/1942 | Hasche | 252—454 |
| 2,634,269 | 4/1953 | England | 260—239.3 |
| 3,184,415 | 5/1965 | Huntley et al. | 252—461 |
| 3,381,011 | 4/1968 | Hall | 252—454 |

OTHER REFERENCES

Chemical Abstracts, vol. 34, pp. 6836-7 (1940), abstracting G. Shuraev "Org. Chem. Ind." (USSR), vol. 6, pp. 595-6 (1939).

HENRY R. JILES, Primary Examiner

R. T. BOND, Assistant Examiner